INVENTORS:
David M. Boyd
Charles E. Wood
BY:
James R. Hoatson, Jr.
Philip T. Liggett
ATTORNEYS United States Patent Office 3,826,719
Patented July 30, 1974

3,826,719
FRACTIONATOR CONTROL SYSTEM FOR REBOILING NARROW BOILING RANGE LIQUIDS
David M. Boyd, Clarendon Hills, and Charles E. Wood, Mount Prospect, Ill., assignors to Universal Oil Products Company, Des Plaines, Ill.
Continuation of abandoned application Ser. No. 7,024, Jan. 30, 1970. This application Mar. 17, 1972, Ser. No. 235,761
Int. Cl. B01d 3/42
U.S. Cl. 203—1
10 Claims

ABSTRACT OF THE DISCLOSURE

Method and system for controlling the reboiling function of a fractional distillation column. Means is provided for passing reboiler liquid from a lower section of the column to the reboiler at a constant predetermined rate of flow. Operatively associated with the reboiler, is a means to vary the heat input thereto. Operatively associated with the reboiler vapor return line is a means for establishing a flow signal representative of the rate of flow of heated fluid passing therethrough. Although the flow signal is not directly correlatable with the rate of flow of the heated fluid, since the heated fluid normally leaving the reboiler is a vapor-liquid mixture, the flow signal is passed to the heat input varying means, whereby heat input is regulated responsive to the flow signal. The phase distribution of the vapor-liquid mixture is thereby held constant, thus maintaining the column under conditions of thermal equilibrium. The invention has particular application where the reboiler liquid is a substantially pure compound or a component mixture having a boiling range of about 10° F. or less.

CROSS-REFERENCE TO RELATED APPLICATION

This application is a continuation application of our copending application Ser. No. 7,024, filed Jan. 30, 1970 and now abandoned.

BACKGROUND OF THE INVENTION

The present invention relates to a method and system for reboiling a fractionation column.

The present invention particularly relates to a method and system for reboiling a fractionation column wherein the reboiler liquid comprises a component mixture having a boiling range of about 10° F. or less.

The present invention more particularly relates to a method and system for reboiling a fractionation column wherein the reboiler liquid comprises a substantially pure compound.

As is known to those skilled in the art, reboiling of a fractionation column comprises, in its simpliest terms, the circulation of a hot liquid from a lower section of the column to a reboiling heat exchanger wherein the liquid is heated and a substantial amount of the liquid is vaporized. The heated liquid and vapor return to the bottom of the distillation column wherein the vapor passes up into the column to provide a stripping medium for stripping out low boiling constituents from the liquids passing down the column.

The column is kept in thermal balance by the amount of heat passed into the column by the reboiling operation. This heat input to the column is provided in two portions. The first portion is the increased sensible heat of the heated liquid passing back to the column. However, the greatest portion of the heat input is the latent heat of vaporization absorbed by the vapor which is generated in the reboiling operation. Furthermore, the separation efficiency of the distillation is dependent in great part upon the amount of vapor which is produced for stripping low boiling constituents out of the liquid in the stripping section of the column.

Accordingly, then, the basic reboiling process is designed to adjust the flow of heating medium to the reboiler in order to control the heat input into the column by producing a controlled amount of reboiler vapor as required for thermal equilibrium and design separation efficiency.

Generally the control of the flow of heating medium to the reboiler is achieved in response to temperature changes occurring within the reboiling operation. This is typically accomplished by provision of temperature sensing means such as a thermocouple in the reboiler vapor return line or in a lower section of the fractionator stripping zone. Changes in temperature indicate changes in thermal balance for the fractionation column so that a temperature controller typically is utilized to receive the temperature signal and reset the flow of heating medium to the reboiler. In this manner, more or less liquid will be vaporized in the reboiler as required to return the sensed temperature to the control point and thereby hold the fractionation column in thermal equilibrium.

However, temperature control of the reboiler operation cannot be satisfactorily utilized when the liquid being reboiled is a substantially pure compound or a component mixture having a boiling range of about 10° F. or less.

When the liquid is a pure compound, it is at its boiling point so that no temperature gradient is available for control purposes anywhere in the reboiler circuit or in the lower section of the stripping zone. The temperature will remain the same at the typical prior art sensing point, regardless of whether excess vapor is being generated in the reboiler or insufficient vapor is being generated. Thus, it becomes extremely difficult to hold the column under thermal equilibrium.

Similarly, when a pure compound or a narrow boiling range mixture is being reboiled, the use of process temperature control on the reboiler heat input is not feasible due to the critical effect of pressure variations within the distillation system. For such constant boiling pure compounds, or for narrow boiling range mixtures, any shift in fractionating column pressure will cause a corresponding shift in the boiling point of the pure compound, or in the vapor temperature of the narrow boiling range mixture, without appreciably changing the rate of vapor generation in the reboiler. Thus, a slight change in fractionating column pressure will cause a change in temperature which is not truly indicative of a change in the reboiling function. Accordingly, then, a temperature control system will make a compensating change in heat input to bring the temperature back to the control point even when no compensation thereof is actually required for purposes of thermal equilibrium.

SUMMARY OF THE INVENTION

Accordingly, therefore, it is an object of the present invention to provide a method and system for reboiling a fractionation column.

It is a further object of the present invention to provide a method and system for reboiling a fractionation column wherein the reboiler liquid comprises a component mixture having a boiling range of about 10° F. or less.

It is a still further object of the present invention to provide a method and system for reboiling a fractionation column wherein the reboiler liquid comprises a substantially pure compound.

It is a more particular object of the present invention to provide an improved method and system for reboiling a fractionation column which is self-compensating and unaffected by pressure fluctuations occurring within the fractionation system.

These and other objects of the present invention as well as the advantages thereof will become more clear as the invention is more fully disclosed hereinafter.

As pointed out hereinabove, the greatest portion of the heat input to a fractional distillation column is the latent heat of vaporization absorbed by the vapor which is generated in the reboiling operation. Thus in order to maintain the column under conditions of thermal equilibrium, sufficient vapor must be generated and passed from the reboiler to the column to supply the requisite amount of heat. However, it is not possible to accurately measure and control the amount of vapor generated in the reboiler and passed therefrom to the column, since the heated fluid which normally passes from the reboiler to the column via the reboiler vapor line is a mixture of liquid and vapor phases. Notwithstanding, the heated fluid flowing in the vapor line can be utilized to generate a flow signal which is indicative of the mixed phase fluid flow even though no correlation or calibration is possible by which the distribution between liquid and vapor phase can be accurately determined.

By the practice of the present invention then, the flow signal generated by the flow of the vapor-liquid mixture, passing from the reboiler to the fractionating column via the reboiler vapor line, is utilized to control the heat input to the fractionator reboiler and thereby maintain the column under thermal equilibrium.

Accordingly, the present invention may be broadly characterized as a method for controlling the reboiling of a contiuous flow fractional distillation column, wherein a fluid mixture is separated into a low boiling overhead fraction and into a high boiling bottoms fraction, said column including a lower section containing a liquid inventory of said bottoms fraction, a reboiler heat exchanger having a vapor outlet, conduit means for passing heated fluid from said vapor outlet to said lower section, and means to supply heat to said reboiler heat exchanger from an extraneous source, which comprises: (a) passing at least a portion of said bottoms fraction from said lower section to said reboiler heat exchanger at a constant predetermined rate of flow; (b) heating said bottoms fraction within said reboiler heat exchanger under conditions sufficient to provide said heated fluid; (c) passing said heated fluid via said conduit means and developing therein a flow signal representative of the flow of said heated fluid; (d) transmitting said flow signal to control means operatively associated with said heat supply means; and (e) regulating said heat supply means to provide a heat input to said reboiler heat exchanger sufficient to maintain said flow signal, and thereby maintain said column under thermal equilibrium.

The present invention may be further characterized as a control system for use in combination with a continuous flow fractional distillation column, wherein a fluid mixture is separated into a low boiling overhead fraction and into a high boiling bottoms fraction, said column including a lower section containing a liquid inventory of said bottoms fraction, a reboiler heat exchanger having a vapor outlet, conduit means for passing heated fluid from said vapor outlet to said lower section, and means to supply heat to said reboiler heat exchanger from an extraneous source, said system comprising: (a) means for passing at least a portion of said bottoms fraction from said lower section to said reboiler heat exchanger at a constant predetermined rate of flow; (b) operatively associated with said heat supply means, means to vary the heat input to said reboiler heat exchanger; (c) operatively associated with said conduit means, means for establishing a flow signal representative of the rate of flow of heated fluid passing therethrough; (d) means receiving said flow signal and developing an output signal functionally representative of said flow signal; and (e) means transmitting said output signal to said heat input varying means, whereby the heat input to said reboiler heat exchanger is regulated responsive to the flow of said heated fluid, and said fractionating column is thereby maintained under conditions of thermal equilibrium.

The present invention is clearly set forth in the accompanying figures which comprises simplified schematic flow diagrams of a typical fractionation column wherein the inventive control system is utilized.

FIG. 1 illustrates the invention, as characterized by the broad embodiments defined hereinabove.

FIG. 2 illustrates a preferred and more narrow embodiment of the present invention.

FIG. 3 illustrates an embodiment which is preferred where the fractionation column operates at a high reflux ratio and produces a net bottoms product at a low rate of flow.

DESCRIPTION OF THE DRAWINGS

The embodiment illustrated in FIG. 1 shows a typical fractionation column wherein the inventive control system is utilized. The embodiment illustrated therein sets forth a control system which has been used commercially for the separation of high purity ethylbenzene from a mixture containing ethylbenzene, paraxylene, and metaxylene.

Figure 1:
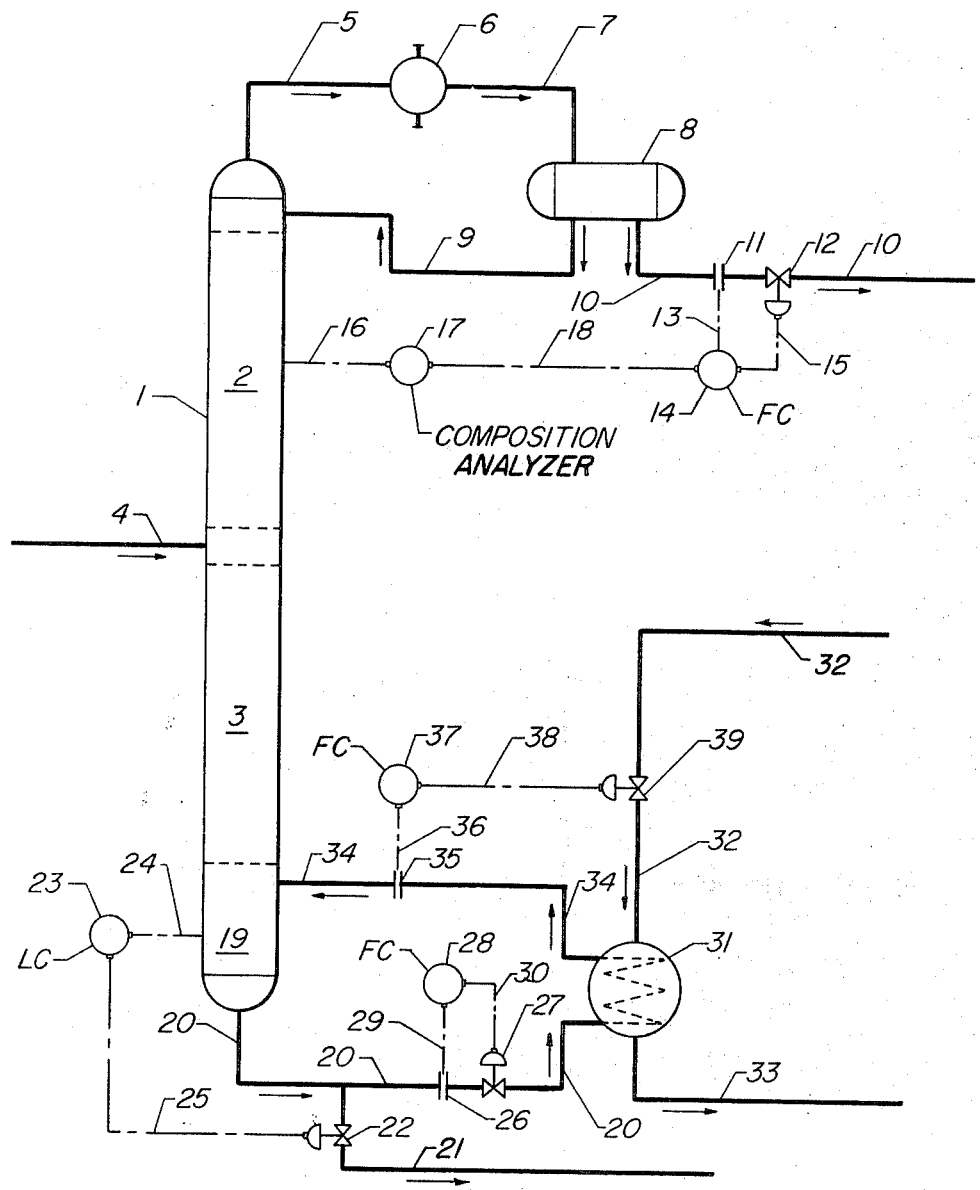
Referring now to FIG. 1, there is shown a typical fractionating column 1 containing a rectification zone 2 above the feed point and a stripping zone 3 below the feed point. The feed mixture comprising ethylbenzene, paraxylene, and metaxylene enters the column via line 4. The operating conditions within the fractionating column are maintained sufficient to separate high purity ethylbenzene from the xylene mixture.

Ethylbenzene vapor is removed from column 1 via line 5 and passed to an overhead condenser 6 wherein the vapor is cooled and condensed to produce an ethylbenzene liquid. The resulting condensed and cooled ethylbenzene liquid passes from condenser 6 to receiver 8 via line 7, wherein the liquid is separated from any noncondensed gases contained within the system. Ethylbenzene reflux is returned to the fractionating column via line 9 at a controlled rate of flow utilizing a typical reflux flow control system, not shown.

A net ethylbenzene product is removed from receiver 8 via line 10. The withdrawal rate is controlled by a flow control loop comprising an orifice 11 contained in line 10 and a control valve 12. The flow sensing means 11 transmits a flow signal via line 13 to flow controller 14. Flow controller 14 transmits a flow control signal via line 15 to control valve 12. Since the purity of the ethylbenzene overhead fraction is the controlling specification in operation of the fractionating column, there is provided at the rectification zone 2 a means 16 for continuously removing a sample of the liquid contained within the rectification zone. The liquid sample is continuously transmitted via line 16 to a composition analyzer 17 which may typically comprise a chromatographic analyzing system. The analyzer 17 transmits a composition signal indicative of the composition of the liquid contained within the rectification zone at the sampling point. The composition signal is passed via line 18 to the automatically adjustable setpoint of the flow controller 14 whereby the rate of withdrawal of high purity ethylbenzene via line 10 is controlled responsive to changes in the composition of the material within the rectification zone 2.

The fractionating column 1 contains a zone 19 at the bottom, wherein bottoms liquid is accumulated. The bottoms fraction comprising a mixture of metal and paraxylene is withdrawn from the lower section or collecting zone 19 by pump means, not shown, via line 20. A portion of this mixture is withdrawn via line 21 as a net bottoms fraction. The rate of withdrawal of net bottoms is controlled by a valve 22 contained in line 21. Valve 22 is operated by a level controlled 23 which receives a level signal by means of a level sensing means 24 in the lower section or zone 19. The level controller 23 transmits the level control signal to valve 22 via line 25.

The greater portion of the bottoms liquid is withdrawn from zone 19 and passed via line 20 to the reboiler heat exchanger 31. The rate of flow of bottoms liquid passing to the reboiler is held constant by a flow control loop. The flow control loop comprises a sensing means such as an orifice 26, and a valve 27 contained in line 20. Orifice 26 passes a flow signal via line 29 to a flow controller 28 which in turn passes a flow control signal via line 30 to valve 27. In this manner, the flow of bottoms liquid to the reboiler heat exchanger 31 is maintained constant at all times.

In typically starting up the fractionation column, bottoms liquid is passed via line 20 and orifice 26 at a predetermined constant rate of flow, while heating medium is passed into the reboiler 31 by manual control of valve 39. The heating medium enters the reboiler 31 via line 32 and is discharged therefrom via line 33. The bottoms liquid is heated and at least partially vaporized within the reboiler 31. The resulting heated fluid is withdrawn from the reboiler via line 34, and it is passed into the fractionating column at the lower section 19. In order to sense the flow of the heated fluid which comprises a mixture of vapor and liquid, a flow sensing means such as an orifice 35 is contained within line 34. Orifice 35 transmits a flow signal via line 36 to a flow controller 37 which, at initial start-up, is maintained on manual control to manually adjust valve 39 and thereby control the reboiler heat input. Once the fractionating column has stabilized under manual operating conditions, the flow controller 37 is switched from manual operation to automatic control. The flow controller thereafter transmits a flow control signal via line 38 to valve 39 in order to regulate the flow of heating medium to the reboiler.

It is to be noted that once flow controller 37 is switched from manual control to automatic control, the heat input to reboiler 31 is adjusted by means of valve 39 responsive to fluctuations in the ratio of vapor and liquid phases in the flow which is indicated by the orifice 35. Orifice 35 is transmitting a flow signal via line 36 to flow controller 37 which is correlatable with the amount of vapor being generated by the reboiler 31 and passed via line 34 to fractionator 1. While the flow signal transmitted by line 36 is indicative of the flow of the vapor-liquid mixture passing through orifice 35, it is not uniquely correlatable with any numerically absolute measurement of the distribution between vapor and liquid phases.

Consequently, flow controller 37 adjusts the heat input to the reboiler in order to maintain a constant signal from orifice 35 via line 36, this signal being indicative of the flow of the mixture as evidenced by the pressure drop across orifice 35. When an excessive amount of vapor is generated within reboiler 31, the pressure drop across orifice 35 is increased and the flow controller 37 will act to reduce the heat input to the reboiler in order to return the pressure drop to the original setting. Similarly, when the pressure drop across orifice 35 falls off, this is indicative of a loss of vapor generation within the reboiler 31, and flow controller 37 will make a compensating adjustment to the flow of heating medium in line 32 in order to return the pressure drop across orifice 35 to the setpoint, and thereby reestablish the equilibrium distribution between vapor and liquid phases for the mixture passing through line 34.

In summary then, fractionating column 1 is maintained under conditions of thermal equilibrium by passing bottoms liquid from zone 19 to reboiler 31 at a constant rate of flow, and utilizing flow controller 37 to adjust the heat input to reboiler 31 in a manner sufficient to generate vapor within the reboiler in an amount sufficient to hold a constant flow signal passing from the orifice 35 to the flow controller 37 via line 36.

Figure 2:
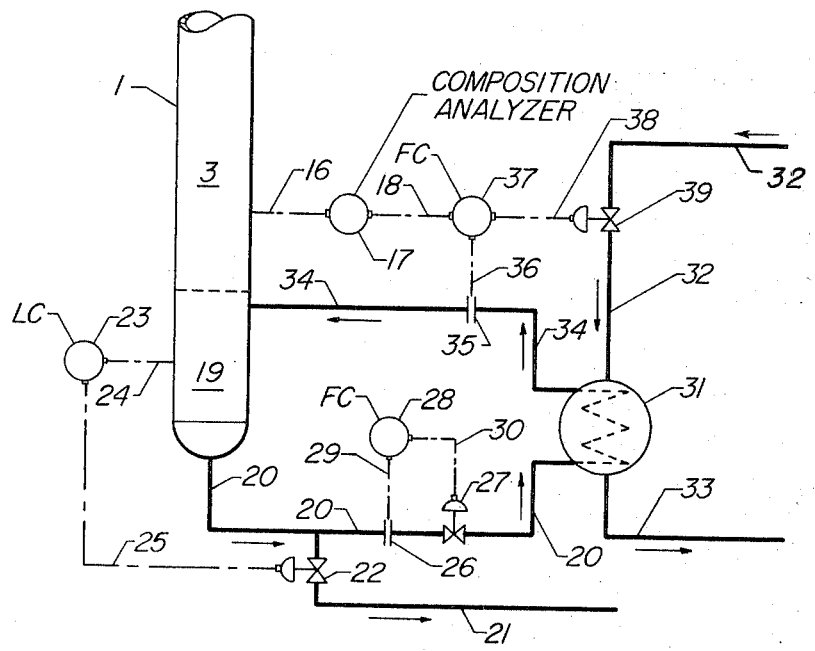

As noted hereinabove, FIG. 1 illustrates an embodiment wherein the overhead product is a desired high purity compound. FIG. 2 illustrates an embodiment wherein the inventive system may be utilized to produce a bottoms fraction which is a high purity compound.

Referring now to FIG. 2, there is shown the lower portion of fractionating column 1 containing the stripping zone 3 and the liquid collecting zone 19 at the bottom of column 1. Liquid is withdrawn from zone 19 via line 20 by means of a pump, not shown. A net bottoms fraction is removed from line 20 via line 21 at a rate controlled by valve 22. Valve 22 responds to a level control signal from a level controller 23, as noted hereinbefore. Level controller 23 receives a level sensing signal 24 and transmits the level control signal to valve 22 via line 25.

The flow of the remaining bottoms liquid passes via line 20 at a constant rate. The rate is held constant by the flow control loop comprising the orifice 26, the flow controller 28, and the control valve 27, as noted hereinabove. The liquid passes into the reboiler heat exchanger 31 wherein at least a portion is vaporized to produce the latent heat of vaporization which is necessary for maintaining column 1 under conditions of thermal equilibrium. The heated fluid, comprising vapor and liquid phases, is passed back to the column 1 via line 34. Again, line 34 contains a flow sensing device such as orifice 35. The flow sensing means 35 passes a flow signal via line 36 to the flow controller 37. Flow controller 37 in turn passes a flow control signal via line 38 to the control valve 39 contained in line 32, whereby heating medium is passed to the reboiler 31 at a controlled rate of flow. Again, the heating medium is discharged from reboiler 31 via line 33.

Since the purity of the bottoms fraction is the specified point of control for the embodiment illustrated in FIG. 2, there is provided within the stripping zone 3 a means for withdrawing a sample of the fluid contained therein via sampling line 16. The sample is continuously passed to composition analyzer 17 which develops a composition signal which is representative of the composition of fluid within the stripping zone. The composition signal is passed via a transmitting means 18 to the flow controller 37, which in this embodiment has an automatically adjustable setpoint.

As the composition of fluid within the stripping zone 3 shifts away from the specification control point, composition analyzer 17 will sense the deviation and transmit a variation in the composition signal via line 18 to the automatically adjustable setpoint of flow controller 37, in order to make a compensating change in the heat input to bring the composition back to the control point. Flow controller 37 will change the rate of heat input into the reboiler 31, whereby the amount of vapor passing through line 34 and orifice 35 will be changed. The change in vapor flow will be indicated by the pressure drop across orifice 35 as transmitted via line 36 to flow controller 37. When the composition within the stripping zone 3 returns to the specification composition, the composition analyzer 17 and flow controller 37 will stabilize the control system at a new vapor-liquid phase distribution for the fluid passing through orifice 35, which will thereby maintain the column under the conditions of thermal equilibrium necessary to produce a bottoms product via line 21 meeting the composition specification.

Figure 3:
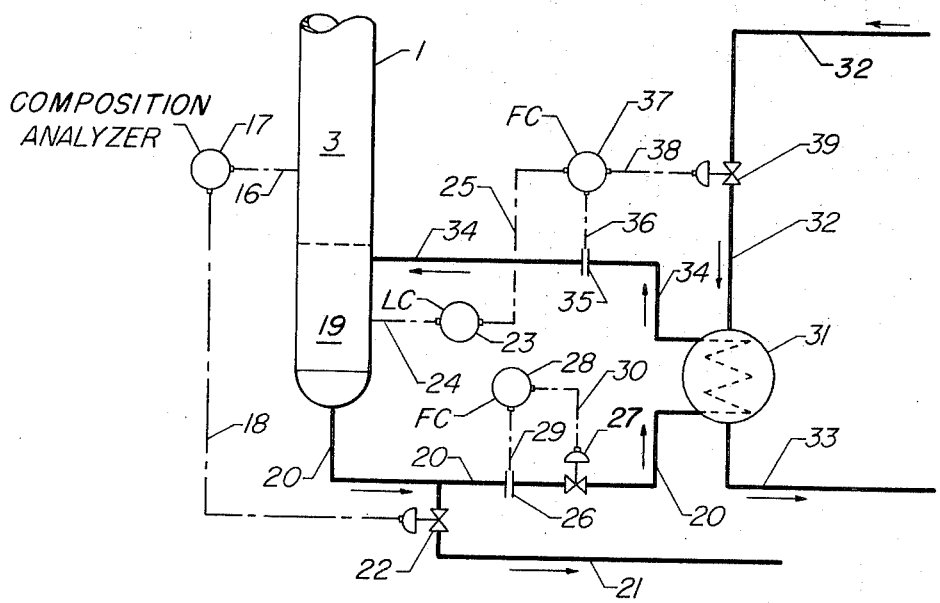

FIG. 3 illustrates an alternate embodiment wherein the bottoms fraction produced by the fractionating column must meet high purity specification. Furthermore, this embodiment has particular application where the column operates at a high reflux ratio to produce a bottoms product at a low flow rate.

In this embodiment, there is again shown in FIG. 3 the lower portion of the fractionating column 1 containing the stripping zone 3 and the liquid collecting zone 19. The elements illustrated in FIG. 1 and FIG. 2 are again indicated in FIG. 3 but in a different configuration.

Again, the liquid is passed from zone 19 to reboiler 31 via line 20 at a rate of flow controlled by the flow control loop comprising orifice 26, flow controller 28, and valve 27. The heated fluid passes from the reboiler 31 to column 1 via line 34 wherein there is again contained the flow sensing device 35 which in the instant embodiment comprises an orifice. The flow of the vapor-liquid mixture in line 34 develops a flow signal passed from orifice 35 via line 36 to flow controller 37. Flow controller 37 again has an automatically adjustable setpoint which, in this embodiment, receives a level signal via line 25 from the level controller 23. Level controller 23 senses the level of liquid within the liquid collecting zone 19 as determined by level sensing means 24.

Again, the purity of the net bottoms product is controlled by utilizing a composition analyzer 17 receiving a continuous sample from the stripping zone 3 via sampling line 16. The composition analyzer develops the composition signal which is passed via line 18 to the control valve 22 contained in line 21.

As the sample passing to composition analyzer 17 via line 16, indicates an increase in lower boiling constituents, composition analyzer 17 will function to throttle down on valve 22. This will cause a gradual rise of liquid level within the collecting zone 19. Level controller 23 will sense the rise in liquid level and send a compensating signal to the automatically adjustable setpoint of flow controller 37, thereby demanding an increase in heat input to the reboiler. Flow controller 37 will increase the flow of heating medium in line 32 by opening valve 39 a slightly greater amount. This in turn will cause a greater amount of vapor to be generated within reboiler 31 so that the heated fluid passing via line 34 into column 1 will strip out the lower boiling constituents which are causing the composition of the continuous sample in line 16 to drift off specification. Thus the flow signal passing via line 36 will be reestablished at a new control point as indicated by the change in the automatically adjustable setpoint of the flow controller 37 due to the level signal 25.

When the composition analyzer 17 senses a change in composition which is indicative of a deficiency of the lower boiling material in the sample withdrawn from zone 3 via line 16, the composition analyzer will function to open valve 22 a slightly greater amount. This will cause an increased production of the net bottoms product, and the liquid level within the collecting zone 19 will gradually fall. Level controller 23 will sense the fall in liquid level and call for a decrease in the amount of vapor generated at reboiler 31. Level controller 23 will send a level signal via line 25 to the automatically adjustable setpoint of flow controller 37. Flow controller 37 will throttle down on valve 39 to cause a lower flow of heating medium through the reboiler 31. This in turn will cause a decrease in the amount of vapor generated within reboiler 31 so that less heat of vaporization is passed into column 1, and less stripping thereby occurs in zone 3. This in turn allows sufficient light ends to reappear in the continuous sample passing via line 16, so that the sample composition returns to the specification setpoint of analyzer 17. With less vapor in the vapor-liquid mixture passing through orifice 35, accordingly then, the control system will stabilize with a smaller flow signal 36 which will correspond to the setpoint of flow controller 37 as modified by the level signal 25.

PREFERRED EMBODIMENTS

The method of operation of the present invention will be clear to those skilled in the art from the foregoing discussion.

However, it must be emphasized that the illustrated flow control loop or some similar flow control system must be located in line 20, and that such a flow control system is a critical element in the inventive system for controlling the reboiling function of a fractionating column. It is critically important that the flow of liquid passing into the reboiler via line 20 be held constant, in order that any fluctuations in the flow signal passing via transmitting means 36 will be indicative of fluctuations in the amount of vapor being generated within reboiler 31. If the flow of liquid passing into the reboiler via line 20 is not held constant, fluctuations in the flow signal 36 will not be indicative of the amount of vapor being generated in the reboiler and, therefore, will not be indicative of the amount of heat input passing into the column as the latent heat of vaporization. Thus under no circumstances should the flow control loop located in line 20 or some equivalent flow control means, be deleted from the control system of the inventive reboiling method.

Although the flow sensing means in line 34 has been illustrated as an orifice 35, other flow sensing means may be utilized in the present invention. However, a device which senses the pressure drop caused by the flowing fluid passing through line 34 is the preferred type of flow sensing means. In one commercial application of the inventive system, an elbow tap was satisfactorily utilized at a bend in line 34. However, the preferred device for sensing the flow of heated fluid in line 34 is an orifice plate, as illustrated in the figures. It has been found that the preferred orifice plate will have an orifice diameter which is equal to seven tenths of the internal diameter of line 34. This size of orifice has been found to develop a pressure drop signal in the range of from 100 to 200 inches of water at the typical hydraulic conditions of flow which exist in a properly designed reboiler vapor line. In addition, it has been found in most commercial applications that this size orifice plate will produce a flow signal that is relatively free of background "noise." Some applications have shown a "noisy" signal which is probably due to slugs of liquid phase passing through the orifice. However, the size of orifice should in no way detract from the broadness of the present invention since in those applications of the inventive control system wherein a noisy flow signal is received, a pulsation dampener may be installed for dampening out the pulsations caused by slugs of liquid passing through the orifice.

It is to be noted that the inventive control system is not dependent on the type of reboiler or the type of heating medium utilized, although a simple heat exchanger has been illustrated in the figures. The system used commercially in controlling reboilers generally has comprised a direct fired furnace, and in such commercial applications valve 39 is utilized to control the flow of fuel to combustion nozzles in the furnace. While valve 39 has been illustrated as a simple control valve, any control means may be utilized. Thus in direct fired furnace applications, a pressure balance valve or a flow control loop may be utilized.

Similarly, although composition analyzer 17 has been noted as being a chromatographic analyzer, other types of composition analyzing devices may be utilized. The composition analyzer may be a device which determines a direct composition of the fluid being sampled, or it may be a device which provides an approximate composition by sensing a physical property of the fluid. Among the direct composition analyzers which may be utilized are chromatographic analyzers, infrared analyzers, and mass spectrometers. Among the composition approximation devices which may be utilized are boiling point monitors, octane analyzers, dielectric constant analyzers, or temperature controllers.

Thus, the composition analyzer 17, which is illustrated in FIG. 2, may be eliminated and a temperature control instrument may be provided in its place as an alternate embodiment. In such a modified embodiment, the temperature controller would analyze a temperature within the stripping zone 3 at an upper locus, and transmit a temperature signal via line 18 to reset the automatically adjustable setpoint of flow controller 37.

These and other modifications to the various elements of the present invention will be readily apparent to those skilled in the art and should not be construed in any manner to detract from the broadness of the present invention.

However, it may now be summarized that a preferred embodiment of the present invention comprises a method for controlling the reboiling of a continuous flow fractional distillation column, wherein a fluid mixture is separated into a low boiling overhead fraction and into a high boiling bottoms fraction, said column including a lower section containing a liquid inventory of said bottoms fraction, a reboiler heat exchanger having a vapor outlet, conduit means for passing heated fluid from said vapor outlet to said lower section, and means to supply heat to said reboiler heat exchanger from an extraneous source, which comprises: (a) passing at least a portion of said bottoms fraction from said lower section to said reboiler heat exchanger at a constant predetermined rate of flow; (b) heating said bottoms fraction within said reboiler heat exchanger under conditions sufficient to provide said heated fluid; (c) passing said heated fluid via said conduit means and developing a pressure drop therethrough; (d) sensing at least a portion of said pressure drop along at least a section of said conduit means, and developing a flow signal representative of said pressure drop; (e) transmitting said flow signal to control means operatively associated with said heat supply means; and, (f) regulating said heat supply means to provide a heat input to said reboiler heat exchanger sufficient to maintain said flow signal, and thereby maintain said column under thermal equilibrium.

Additionally, it may be summarized that a preferred embodiment of the present invention comprises a control system in combination with a continuous flow fractional distillation column, wherein a fluid mixture is separated into a low boiling overhead fraction and into a high boiling bottoms fraction, said column including a lower section containing a liquid inventory of said bottoms fraction, a reboiler heat exchanger having a vapor outlet, conduit means for passing heated fluid from said vapor outlet to said lower section, and means to supply heat to said reboiler heat exchanger from an extraneous source, said system comprising: (a) means for passing at least a portion of said bottoms fraction from said lower section to said reboiler heat exchanger at a constant predetermined rate of flow; (b) operatively associated with said heat supply means, means to vary the heat input to said reboiler heat exchanger; (c) operatively associated with said conduit means, means for establishing a flow signal representative of the pressure drop created by the flow of heated fluid passing therethrough; (d) means receiving said flow signal and developing an output signal functionally representative of said flow signal; and (e) means transmitting said output signal to said input varying means, whereby the heat input to said reboiler heat exchanger is regulated responsive to the flow of said heated fluid, and said fractionating column is thereby maintained under conditions of thermal equilibrium.

Furthermore, it may be summarized that a particularly preferred embodiment comprises the above-defined system wherein said means (d) comprises a flow controller receiving said flow signal and controlling said heat input varying means, whereby the heat input to said reboiler heat exchanger is regulated to maintain said flow signal at a constant predetermined level.

We claim:

1. In a combination with a continuous flow fractional distillation column, wherein a fluid mixture is separated into a low boiling overhead fraction and into a high boiling bottoms fraction, said column including a lower section containing a liquid inventory of said bottoms fraction, an external reboiler heat exchanger having an outlet, conduit means for passing a heated fluid comprising a mixture of liquid and vapor from said outlet to said lower section, and means to supply heat to said reboiler heat exchanger from an extraneous source, a control system for said column comprising:

(a) means for passing at least a portion of said bottoms fractions from said lower section to said reboiler heat exchanger at a constant predetermined rate of flow, a flow control loop operatively associated with said flow means including a flow sensing means and control valves serially connected and a flow controller coupled to said sensing means and control valve;
   (b) operatively associated with said heat supply means, to vary the heat input to said reboiler heat exchanger;
   (c) operatively associated with said conduit means for passing said heated mixture of liquid and vapor, means for establishing a flow signal representative of the rate of flow of said heated mixture of liquid and vapor passing therethrough;
   (d) means receiving said flow signal and developing an output signal functionally representative of said flow signal; and
   (e) means transmitting said output signal to said heat input varying means, whereby the heat input to said reboiler heat exchanger is regulated responsive to the flow of said heated fluid, and said fractionating column is thereby maintained under conditions of thermal equilibrium.

2. Control system of Claim 1 wherein said flow signal of step (c) comprises a measure of pressure drop through at least a portion of said conduit means.

3. Control system of Claim 2 wherein said conduit means comprises a cylindrical section, and said flow sensing means of step (c) comprises an orifice contained within said cylindrical section.

4. Control system of Claim 2 wherein said conduit means comprises a cylindrical section having a cylindrical bend, and said flow sensing means of step (c) comprises an elbow tap contained within said bend.

5. Control system of Claim 1 wherein said means (d) comprises a flow controller receiving said flow signal of step (c) and controlling said heat input varying means, whereby the heat input to said reboiler heat exchanger is regulated to maintain said flow signal at a constant predetermined level.

6. Control system of Claim 5 wherein said flow controller contains an automatically adjustable setpoint, and wherein there is provided means for sensing the temperature within said column at a locus above said lower section, temperature control means operatively connected with said temperature sensing means and developing a temperature output signal, and means transmitting said temperature output signal to said flow controller setpoint, whereby said setpoint is adjusted responsive to said temperature output signal, and said flow signal is thereby regulated by said heat input responsive to said temperature.

7. Control system of Claim 5 wherein said flow controller contains an automatically adjustable setpoint, and wherein there is provided means for sampling a fluid contained within said column at a locus above said lower section, a composition analyzer operatively connected with said fluid sampling means and developing a composition output signal representative of the composition of said fluid, and means transmitting said composition output signal to said flow controller setpoint, whereby said setpoint is adjusted responsive to said composition output signal, and said flow signal is thereby regulated by said heat input responsive to said fluid composition.

8. Control system of Claim 5 wherein said flow controller contains an automatically adjustable setpoint, and wherein there is provided means for sensing the liquid level of said bottoms fraction inventory contained within said lower section, level control means operatively connected with said level sensing means and developing a level output signal, and means transmitting said level output signal to said flow controller setpoint, whereby said setpoint is adjusted responsive to said level output signal, and said flow signal is thereby regulated by said heat input responsive to said liquid level.

9. Method for controlling the reboiling of a continuous flow fractional distillation column, wherein a feed mixture fed to said column is separated into a low boiling overhead fraction and into a high boiling bottoms fraction, said column including a lower section containing a liquid inventory of said bottoms fraction, an external reboiler heat exchanger having a fluid outlet, conduit means for passing a heated fluid mixture comprising liquid and vapor from said fluid outlet to said lower section, and means to supply heat to said reboiler heat exchanger from an extraneous source, which comprises:
  (a) passing at least a portion of said bottoms fraction from said lower section to said reboiler heat exchanger at a constant predetermined rate of flow;
  (b) heating said bottoms fraction within said reboiler heat exchanger under conditions sufficient to provide said heated fluid mixture comprising a liquid and a vapor mixture;
  (c) passing said heated fluid mixture via said conduit means and developing a flow signal indicative of the flow of heated fluid mixture passing therethrough;
  (d) transmitting said flow signal to control means operatively associated with said heat supply means; and
  (e) regulating said heat supply means to provide a heat input to said external reboiler heat exchanger responsive to said flow signal to thereby maintain said column under thermal equilibrium.

10. Method of Claim 9 wherein said flow signal comprises a signal representative of the pressure drop created by said heated fluid passing through at least a portion of said conduit means.

References Cited

UNITED STATES PATENTS

| 3,225,550 | 12/1965 | Kelley et al. | 203—1 |
| 3,434,934 | 3/1969 | Washer | 203—1 |
| 3,269,921 | 8/1966 | Oglesby et al. | 202—206 |
| 3,238,111 | 3/1966 | Harper | 202—206 |
| 3,336,205 | 8/1967 | Rijnsdorp et al. | 203—3 |

WILBUR L. BASCOMB, Jr., Primary Examiner

U.S. Cl. X.R.

202—160, 206; 203—2, 3, Dig. 18; 235—151.12.